July 1, 1930.  V. GUTMANN ET AL  1,768,902
SUBMERSIBLE PUMP MOTOR
Filed July 30, 1928
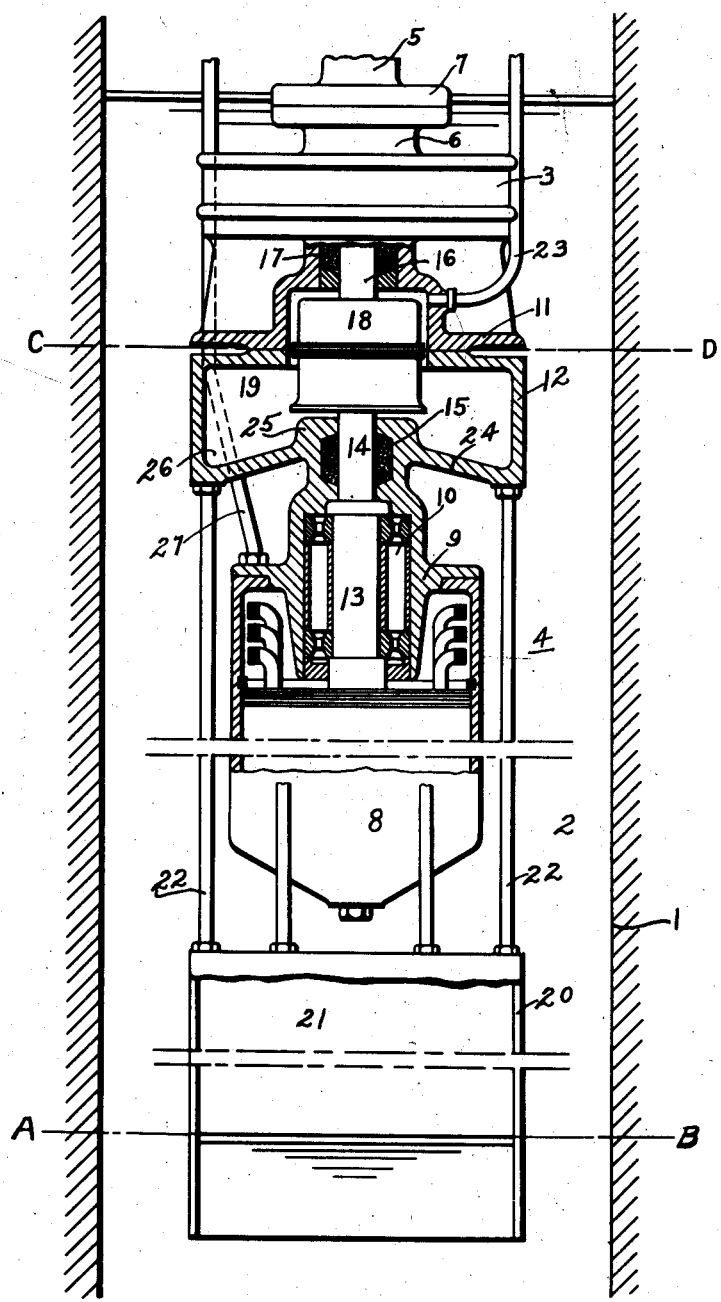
INVENTORS
Victor Gutmann and
Ludwig Steiner
BY
ATTORNEY Patented July 1, 1930

1,768,902

UNITED STATES PATENT OFFICE

VICTOR GUTMANN, OF NUREMBERG, AND LUDWIG STEINER, OF BERLIN, GERMANY, ASSIGNORS TO WESTINGHOUSE ELECTRIC AND MANUFACTURING COMPANY, A CORPORATION OF PENNSYLVANIA

SUBMERSIBLE PUMP MOTOR

Application filed July 30, 1928. Serial No. 296,393, and in Germany October 20, 1927.

Our invention relates, generally, to enclosed electrical machines for operation when immersed in a liquid, and more particularly to electric motors of the submersible type for operating pumps.

In the lifting of liquids, such as oil and water, from bore holes, submersible-type pumping equipments, comprising a pump and a direct-connected operating motor, are commonly employed.

Heretofore, various methods had been resorted to for preventing the entrance of leakage liquid into the motor casing, and for effectively removing leakage liquid which may collect in the casing.

A common method for excluding leakage liquid is to provide for establishing a pressure within the motor casing, or else to surround the motor casing with a jacket which is filled with gas at a pressure greater than the hydrostatic pressure of the liquid in which the motor is immersed.

These methods are unsatisfactory from the operating standpoint. When a gas, under pressure, is provided within the casing, it acts as an insulator and prevents the escape from the motor of heat, which would otherwise be readily absorbed by the liquid, in which the motor casing is immersed. When a separate jacket is provided, the diameter of the unit is considerably larger than that of the motor and it cannot be operated in small bore holes. Further, the jacket prevents the liquid from coming into direct contact with the motor casing.

The object of this invention, generally stated, is to provide for preventing the leakage of a fluid into a submersible type of electrical machine.

A more specific object of the invention is to provide for developing a pressure within an enclosing casing of a submersible electrical machine to prevent the entrance of a fluid.

A further object of the invention is to provide for establishing and regulating a pressure within the enclosing casing of a motor which depends upon the depth of submergence of the machine.

Another object of the invention is to provide for continuously collecting and drain- ing leakage liquid from a motor casing, while the motor is immersed in the liquid.

Other objects of the invention will become evident from the following description, when taken in conjunction with the drawing, in which the single figure is a view, partly in section and partly in side elevation, of a submersible-type electrical pumping set embodying my invention.

Referring to the drawing, the numeral 1 designates, generally, a section of a bore hole or well containing a liquid 2. In order to lift the liquid from the well, a submersible-type electrical pumping set, comprising a pump 3 and an operating motor 4, is provided. The pumping set may be suspended from the top of the well by means of a string of pump tubing 5 which is connected to the discharge port of the pump by means of a suitable coupling 7, the tubing 5 also serving to conduct the pumped liquid from the pump to the top of the well.

As shown, the operating motor 4 is provided with an enclosing casing 8 having a separate end member 9 adapted to receive a suitable main bearing 10. The motor casing is disposed to be connected to the casing 11 of the pump 3 by means of a specially formed casting 12 which is formed integral with the removable end member 9.

In order to connect the motor for operating the pump, the main shaft 13 of the motor is provided with an extension 14 which extends through a suitable stuffing box 15 in the end member 9. The pump shaft is also provided with an extension 16 which extends downwardly through the pump casing 11 and through a suitable stuffing box 17. The shaft extensions 14 and 16 are connected by means of a suitable coupling 18, as shown.

It will be observed that the casting 12, when joined to a lower extension of the pump casing, forms a chamber completely enclosing the drive which connects the motor to the pump, thereby forming a unitary frame structure having a single entrance way extending through the pump chamber and the stuffing box 17.

It will be readily understood that, when the pump is operating, immersed in a liquid, the hydrostatic pressure of the liquid, which is proportional to the height of the liquid above the pump, may be of such magnitude as to force a considerable amount of liquid into the motor casing. This leakage liquid may find its entrance through the joint between the motor and pump casings, which may become opened, or through the stuffing box 17 of the pump. Furthermore, the pump, when in operation, develops a back pressure which likewise tends to force a certain amount of liquid, which is being pumped, through the stuffing box 17, into the motor casing.

In order to prevent the entrance of leakage liquid in this manner, provision is made for developing a pressure within the motor casing which is greater than the hydrostatic pressure of the liquid outside the casing. In this embodiment of the invention, the gas for developing an internal pressure is confined to a relatively small chamber 19, formed by the casting member 12, as hereinbefore described. It will be readily understood, that, since this chamber 19—which will hereinafter be referred to as a packing chamber—is disposed directly underneath the stuffing box 17, the gas pressure is utilized to the greatest advantage, and in no way affects the cooling properties of the motor.

Any suitable means may be utilized for developing the desired pressure in the packing chamber 19. However, the purpose of this invention is to provide the simplest form of pressure-developing means, which, in this instance, is an integral part of the pumping set, thereby making it unnecessary to employ a separate air compressor, or the like.

In this particular embodiment, a suitable pressure is developed in the packing chamber 19 by utilizing a diving-bell device 20, which is disposed beneath the motor and pump, as shown.

It will be readily understood that the pressure developed in the air space 21, upon the submergence of the diving bell 20, will be proportional to the hydrostatic pressure of the liquid at the depth of submergence, and that, by connecting the diving bell to any part of the motor casing which is at a higher level, a pressure may be developed in the casing which is greater than the hydrostatic pressure of the liquid at the level of the casing.

In this embodiment of the invention, the diving bell 20 is connected to the packing chamber 19 by means of a plurality of communication tubes 22, which form a cage structure around the motor casing, as shown.

Therefore, when the pumping set is immersed, the gas which is trapped in the bell will be compressed and conveyed to the chamber at a pressure which is equal to the height of the liquid in the well above the datum line AB, which is at a lower level than the datum line CD. Therefore, the pressure in the casing is greater than the hydrostatic pressure outside the casing.

It will be readily understood that the pressure which is developed in the packing chamber 19 may be regulated to any desired value by varying the distance at which the diving bell 20 is suspended beneath the casting member 12. Since the pumping set always remains at the same level, a constant presure is exerted upon the stuffing box 17 and, therefore, leakage liquid is prevented from entering the packing chamber 17, even though the pump is not in operation.

It will be evident that, after the pumping set has been operating for a considerable length of time, the packing in the stuffing box 17 may become so worn as to permit the escape of the gas which is contained in the packing chamber 19. Under such operating conditions, the pressure may be restored by lifting the diving bell 20 above the level of the liquid in the well, to permit the chamber to fill with gas, which will be compressed when the pumping set is lowered to its operating position.

In order to provide for restoring the gas pressure without disturbing the pump, a pipe 23 is provided which is connected to the top of the packing chamber 19, as shown. The pipe 23 may be connected to a source of compressed gas at the top of the well, from which gas may be pumped into the packing chamber 19, whenever necessary. However, it is to be understood that, so long as a packing in the stuffing box 17 is in such condition as to prevent the rapid leakage of gas from the chamber, the quantity contained in the diving bell 20 is sufficient to maintain an adequate pressure for a considerable length of time.

In order to provide for disposing of any leakage liquid which may find entrance into the packing chamber 19, the bottom 24 of the chamber is provided with a raised central portion 25 to form an annular basin 26, which may be utilized for the collection of leakage fluid. Therefore, the depth of the leakage fluid in the chamber must become greater than the height of the central portion 25 before leakage through the stuffing box 15 and into the motor casing 8 may occur.

Since the pressure in the gas space 21 of the diving bell 20 is the same as the pressure in the packing chamber 19, any leakage liquid which may collect in the annular basin 26 will readily drain downwardly through the communication tubes 22.

As an added safe-guard against the entrance of leakage liquid into the motor casing 8, through the stuffing box 15, compressed gas may be supplied through the gas line 27, from any suitable source of gas supply (not shown).

It will be readily understood that, by using a cage structure, comprising the communication tubes 22, for supporting the diving bell 20, the liquid which is being pumped is thereby permitted to come directly into contact with the motor casing 8 and, therefore, the maximum cooling effect upon the motor is obtained. Other forms of supporting structures may be utilized for suspending the diving bell 20 from the motor casing, but it is evident that a cage type, as shown, provides for the maximum exposure of the motor casing to the cooling capacity of the liquid in the well.

In view of the foregoing description, it is evident that this type of construction provides for utilizing to the greatest advantage a gas pressure for excluding leakage liquid from the motor casing, since the pressure is confined to the point at which it is most effective. By concentrating the gas pressure in a separate compartment of the motor casing from that which contains the motor proper, a smaller quantity of gas is required to obtain the same or better results, than if the motor casing was completely filled with gas. Furthermore, the removal of the gas from the motor casing permits the motor to operate more efficiently and, therefore, a motor of small size may be utilized to develop the required amount of power for operating the pump.

It may be stated, in conclusion, that, while the illustrated example constitutes a practical embodiment of our invention, we do not wish to limit ourselves strictly to the exact details herein shown, since modifications of the same may be made without departing from the spirit of the invention, as defined in the appended claims.

We claim as our invention:

1. In a submersible pump unit for pumping liquids, in combination, a pump, a motor for operating the pump, a drive interposed between the motor and the pump, a packing-chamber enclosing the drive, and means carried by the pump unit for developing a gas pressure in the packing-chamber which is greater than the outside pressure at the same level to prevent the entrance of liquid, the pressure so developed in the packing chamber being proportional to the depth of the liquid in which the pump unit is operating.

2. In a submersible pump unit for pumping liquids, in combination, a pump, a motor or driving the pump, a drive interposed between the pump and the motor, a chamber disposed between the pump and the motor enclosing a part of the drive, and means for developing a pressure in the chamber which is greater than the liquid pressure outside the chamber, the functioning of said means being dependent on the lowering of the pump unit into a liquid.

3. In a submersible pump unit for pumping liquids, in combination, a pump, a motor for operating the pump, a motor-casing having a packing-chamber surrounding the motor-shaft between the pump and the motor-casing, and hydrostatically-controlled means connected to the packing-chamber disposed to create a pressure within the chamber corresponding to the liquid pressure at a predetermined distance below the packing chamber.

4. In a submersible pump unit for pumping liquids, in combination, a pump, a motor for operating the pump, a motor-casing having a packing-chamber surrounding the motor-shaft at a point between the pump and the motor-casing, means disposed for submergence beneath the motor for developing a gas pressure, and a plurality of pressure tubes connecting the packing-chamber and pressure-developing means to subject the packing-chamber to the gas pressure.

5. In a submersible pump unit for pumping liquids, in combination, a pump, a motor for operating the pump, a casing for the motor provided with a casting member for connecting the motor casing to the pump, said casting member being disposed to form a packing-chamber surrounding the motor shaft, means for developing a pressure in response to the lowering of the pump in a liquid, and means for connecting the packing-chamber and pressure-creating means to effect an equalization of their pressures.

6. In a submersible pump unit, in combination, a pump for pumping liquids, a motor for operating the pump, a drive connected between the motor and the pump, a casing into which the drive extends, and means disposed to develop a greater pressure in the casing than the outside liquid pressure, said means comprising a diving-bell suspended beneath the motor and pump and a plurality of tube members connecting the diving-bell and the casing, to permit an unobstructed flow of liquid in direct contact with the motor casing.

7. In a submersible pump unit for pumping liquids, in combination, a pump, a motor for operating the pump, a motor-casing comprising a main-chamber and an auxiliary-chamber, said auxiliary-chamber being disposed between the main-chamber and the pump, a diving-bell disposed to function as a pressure source, and means for supporting the diving-bell beneath the motor-casing, said means being disposed to afford communication between the diving-bell and the auxiliary-chamber.

8. In a submersible pump unit for pumping fluids, in combination, a pump, a motor for operating the pump, a motor casing comprising a main chamber and an auxiliary chamber, said auxiliary chamber being disposed between the main chamber and the pump, a diving-bell, and a plurality of tube members for suspending the diving-bell beneath the auxiliary chamber to form a gas reservoir to establish a gas pressure inside the auxiliary chamber greater than the outside liquid pressure at the same level, said tubes being disposed to carry leakage liquid from the auxiliary chamber into the gas space in the diving-bell after its submergence in the liquid.

9. In a submersible pump unit for pumping liquids, in combination, a pump, a motor for operating the pump, a motor-casing comprising a main-chamber and an auxiliary-chamber, said auxiliary-chamber being disposed between the main-chamber and the pump, a diving-bell, means connecting the diving-bell in suspended relation underneath the auxiliary-chamber for subjecting said auxiliary-chamber to the same pressure as that developed in the diving-bell upon its submergence in the liquid to a greater depth than the auxiliary chamber, said means being disposed to permit the flowing of leakage liquid from the auxiliary-chamber.

10. In a submersible pump unit, in combination, a pump, a motor for operating the pump, a drive interposed between the pump and the motor, a chamber interposed between the pump and the motor for enclosing the drive, and means suspended from the pump chamber controlled by the external liquid pressure for developing a pressure in the chamber which is greater than the liquid pressure outside the chamber, said means being disposed to permit drainage of leakage liquid from the chamber under the influence of the pressure developed.

In testimony whereof, we have hereunto subscribed our names this 29th day of June, 1928.

VICTOR GUTMANN.
LUDWIG STEINER.